United States Patent Office 2,884,452
Patented Apr. 28, 1959

2,884,452

VINYLSULFONYL FLUORIDES AND PREPARATION THEREOF

Otto Scherer and Paul Fritz Schacher, Frankfurt am Main, Germany, assignors to Farbwerke Hoechst Aktiengesellschaft vormals Meister Lucius & Bruning, Frankfurt am Main, Germany, a corporation of Germany No Drawing. Application October 8, 1956
Serial No. 614,356

15 Claims. (Cl. 260—543)

This invention relates to vinylsulfonyl fluorides and to an improved process for the preparation thereof. In one aspect this invention relates to an improved process for the preparation of vinylsulfonyl fluoride. In another aspect this invention relates to the production of 2-halovinylsulfonyl fluorides such as 2-chlorovinylsulfonyl fluoride.

An object of this invention is to provide an improved process for the production of vinylsulfonyl fluorides which process leads to the formation of desired product in high yield with good selectivity.

Another object is to provide an improved process for the production of vinylsulfonyl fluorides which process employs a reactant which can be regenerated readily and returned to the reaction zone for reuse.

Another object is to provide an improved and economical process for the preparation of vinylsulfonyl fluoride.

Various other objects and advantages of the present invention will become apparent to those skilled in the art from the accompanying description and disclosure.

Accordingly, these objects are accomplished by the dehydrohalogenation process which comprises reacting a 2-haloethanesulfonyl fluoride at a temperature not higher than 40° C. in an aqueous medium in the presence of an alkaline substance which is capable of combining with the hydrogen halide evolved during the course of the reaction, to produce a vinylsulfonyl fluoride. For best results, i.e., in order to obtain the highest yield of desired vinylsulfonyl fluoride, the dehydrohalogenation reaction is carried out at a pH between 7 and 10. The dehydrohalogenating agents of this invention include the inorganic alkaline compounds and salts thereof such as carbonates including bicarbonates and various metal oxides, and hydroxides, the preferred compounds being the relatively mild alkaline substances such as, for example, the alkali and alkaline earth metal carbonates and bicarbonates, and the alkaline earth metal oxides and hydroxides.

The 2-haloethanesulfonyl fluorides which are dehydrohalogenated in accordance with this invention are those having at least one, and preferably not more than two, chlorine or bromine atoms substituted on the beta- or 2-carbon atom of the ethane radical and are, for example, 2-chloroethanesulfonyl fluoride ($ClCH_2CH_2SO_2F$) and 2,2-dichloroethanesulfonyl fluoride ($Cl_2CHCH_2SO_2F$).

Typical examples of suitable dehydrohalogenating agents to be used in accordance with this invention are alkalihydroxides, such as sodium hydroxide, potassium hydroxide, oxides and hydroxides of alkaline earth metals having an atomic weight of at least 40 such as calcium hydroxide, calcium oxide, strontium oxide or hydroxide or barium oxide or hydroxide. Examples of the preferred dehydrohalogenating agents to be used in accordance with this invention are sodium bicarbonate, potassium bicarbonate, sodium carbonate, magnesium oxide, magnesium hydroxide, calcium carbonate, and any admixture thereof. Such substances are capable of combining with the hydrogen halide produced during the course of the reaction to form the corresponding metal halide. The alkaline starting material can then be regenerated from the metal halide by-product by conventional techniques and returned to the reaction zone to effect further dehydrohalogenation of the 2-haloethanesulfonyl fluoride.

The fact that the presently described dehydrochlorination reaction, for example, is capable of being effected under such mild operating conditions, i.e. in an aqueous system at a temperature between about 0° C. and 40° C. and at a pH not higher than 10 is surprising and unexpected, since dehydrochlorination of chloroethanes to chlorine-free or chlorine-containing ethylenes requires the use of strongly alkaline and caustic substances such as sodium hydroxide at elevated temperatures above 40° C.

The following examples are offered as a better understanding of the present invention and are not to be construed as unnecessarily limiting thereto.

*Example 1*

146.5 grams of 2-chloroethanesulfonyl fluoride are stirred into 250 cc. water at room temperature. While cooling, one slowly adds 22 grams of magnesium oxide which gradually goes into solution. After a brief period of further stirring at 40° C., the two layers are separated. One obtains 90 to 92% of the theoretical amount of pure vinylsulfonyl fluoride from the distillation of the organic layer. The aqueous magnesium chloride liquor is worked up in the usual manner by adjusting the pH thereof, to yield magnesium hydroxide which can be reemployed.

*Example 2*

The procedure of Example 1 is repeated except that a corresponding quantity of sodium bicarbonate is used as the dehydrochlorination agent instead of magnesium oxide. One works suitably at about 0° C. at the beginning of the reaction and at about 20° C. at the end of the reaction. The yield of vinylsulfonyl fluoride amounts here to more than 80% of the theoretical amount.

*Example 3*

The procedure of Example 1 is repeated except that 181 g. of 2,2-dichloroethanesulfonyl fluoride are used instead of 2-chloroethanesulfonyl fluoride. The dehydrochlorination is effected in the presence of 22 g. of magnesium oxide and under the same temperature conditions as described in Example 1 above. The organic layer is separated and is distilled to yield 2-chlorovinylsulfonyl fluoride in a better than 90% yield. This new compound is a colorless liquid having a boiling point of 131.5° C. at 760 mm. mercury pressure.

*Example 4*

The procedure of Example 2 is repeated except that 2,2-dichloroethanesulfonyl fluoride is used instead of 2-chloroethanesulfonyl fluoride. The dehydrochlorination is effected in the presence of sodium bicarbonate and under the same temperature conditions as described in Example 2 above. The organic layer thereby obtained is distilled to yield 2-chlorovinylsulfonyl fluoride (boiling point 131.5° C. at 760 mm. mercury pressure) in a better than 90% yield. This new compound simultaneously contains an ethylene linkage and a sulfonyl fluoride group, and can, therefore, be subjected to various chemical reactions. It is particularly useful as a copolymerizing monomer with vinyl acetate, styrene, acrylonitrile, acrylic acid esters, methacrylic acid esters, vinylchloride, fluorine containing monomers such as trifluorochlorethylene, for example, to produce plastic and resinous copolymers useful as protective coatings, films, threads and other articles of manufacture. Copolymerization products from 2-chlorovinylsulfonyl fluoride and vinyl acetate have a higher softening point than polyvinylacetate. Such products may be saponified by means of acid or alkaline agents in an alcoholic solution if desired in the presence of aldehydes, thus yielding polyvinyl alcohols which still contain most of the sulfonyl fluoride groups originally contained in the copolymerization products and the hydroxylic groups of which may in part or completely be acetalized.

The 2,2-dichloroethanesulfonyl fluoride employed in the above examples has a boiling point of 68° C. at 14 mm. mercury pressure and is prepared by the chlorination of ethane sulfofluoride at a temperature of 25 to 60° C. under exposure to light according to the process described in German Patent 907,775.

*Example 5*

146.5 grams of 2-chlorethanesulfofluoride are suspended in 250 cc. of water and the suspension is cooled to 0° C. While stirring and cooling to 0 to +5° C., there are added dropwise 400 grams of a 10% sodium hydroxide solution. The organic layer is removed by distillation to obtain 65 grams of vinylsulfofluoride (=70% of the theoretical value calculated on converted 2-chlorethanesulfofluoride).

*Example 6*

75 grams of 2-chlorethanesulfofluoride are suspended in 200 cc. of water. The temperature is kept at −2 to +6° C. while calcium oxide is slowly added. After acidification of the organic layer there are obtained 29 grams of vinylsulfofluoride in addition to 17 grams of unreacted 2-chlorethanesulfofluoride.

We claim:

1. A dehydrohalogenation process which comprises reacting a compound selected from the group consisting of 2-haloethanesulfonyl fluoride and 2,2-haloethanesulfonyl fluoride in which the halogen is selected from the group consisting of chlorine and bromine at a temperature not higher than 40° C. in an aqueous medium containing an alkaline substance capable of combining with hydrogen halide, to produce a vinylsulfonyl fluoride.

2. A dehydrohalogenation process which comprises reacting a compound selected from the group consisting of 2-haloethanesulfonyl fluoride and 2,2-haloethanesulfonyl fluoride in which the halogen is selected from the group consisting of chlorine and bromine at a temperature not higher than 40° C. in an aqueous medium containing an alkali metal carbonate, to produce a vinylsulfonyl fluoride.

3. The process of claim 2 in which said carbonate is sodium bicarbonate.

4. A dehydrohalogenation process which comprises reacting a compound selected from the group consisting of 2-haloethanesulfonyl fluoride and 2,2-haloethanesulfonyl fluoride in which the halogen is selected from the group consisting of chlorine and bromine at a temperature not higher than 40° C. in an aqueous medium containing an alkaline earth metal carbonate, to produce a vinylsulfonyl fluoride.

5. The process of claim 4 in which said carbonate is calcium carbonate.

6. A dehydrohalogenation process which comprises reacting a compound selected from the group consisting of 2-haloethanesulfonyl fluoride and 2,2-haloethanesulfonyl fluoride in which the halogen is selected from the group consisting of chlorine and bromine at a temperature not higher than 40° C. in an aqueous medium containing an alkaline earth metal oxide, to produce a vinylsulfonyl fluoride.

7. The process of claim 6 in which said oxide is magnesium oxide.

8. A dehydrohalogenation process which comprises reacting a compound selected from the group consisting of 2-haloethanesulfonyl fluoride and 2,2-haloethanesulfonyl fluoride in which the halogen is selected from the group consisting of chlorine and bromine at a temperature not higher than 40° C. in an aqueous medium containing an alkaline earth metal hydroxide, to produce a vinylsulfonyl fluoride.

9. The process of claim 8 in which said hydroxide is magnesium hydroxide.

10. A dehydrochlorination process which comprises reacting a compound selected from the group consisting of 2-chloroethanesulfonyl fluoride and 2,2-chloroethanesulfonyl fluoride at a temperature not higher than 40° C. in an aqueous alkaline medium having a pH not higher than 10, to produce a vinylsulfonyl fluoride.

11. A process which comprises reacting 2-chloroethanesulfonyl fluoride at a temperature from about 0° C. to 40° C. with sodium bicarbonate in an aqueous medium, to produce vinylsulfonyl fluoride as the product of the process.

12. A process which comprises reacting 2-chloroethanesulfonyl fluoride at a temperature from about 0° C. to 40° C. with magnesium oxide in an aqueous medium, to produce vinylsulfonyl fluoride as the product of the process.

13. A process which comprises reacting 2,2-dichloroethanesulfonyl fluoride at a temperature from about 0° C. to 40° C. with sodium bicarbonate in an aqueous medium, to produce 2-chlorovinylsulfonyl fluoride as the product of the process.

14. A process which comprises reacting 2,2-dichloroethanesulfonyl fluoride at a temperature from about 0° C. to 40° C. with magnesium oxide in an aqueous medium, to produce 2-chlorovinylsulfonyl fluoride as the product of the process.

15. As a new compound, 2-chlorovinylsulfonyl fluoride.

References Cited in the file of this patent

UNITED STATES PATENTS 2,653,973    Hedrick _____ Sept. 29, 1953

OTHER REFERENCES

Groggins: Unit Processes in Org. Synthesis, pp. 219–21 (1952).

Rondestvedt: J. A. C. S., vol. 76, p. 1926 (1954).